(12) United States Patent
Sundaram

(10) Patent No.: US 10,706,027 B2
(45) Date of Patent: Jul. 7, 2020

(54) DATABASE MANAGEMENT SYSTEM WITH DYNAMIC ALLOCATION OF DATABASE REQUESTS

(71) Applicant: SAP SE, Walldorf (DE)

(72) Inventor: P. Meenakshi Sundaram, Walldorf (DE)

(73) Assignee: SAP SE, Walldorf (DE)

( * ) Notice: Subject to any disclaimer, the term of this patent is extended or adjusted under 35 U.S.C. 154(b) by 811 days.

(21) Appl. No.: 15/401,209

(22) Filed: Jan. 9, 2017

(65) Prior Publication Data

US 2018/0196836 A1 Jul. 12, 2018

(51) Int. Cl.
*G06F 17/30* (2006.01)
*G06F 16/21* (2019.01)
(Continued)

(52) U.S. Cl.
CPC ........ *G06F 16/217* (2019.01); *G06F 16/2358* (2019.01); *G06F 16/9024* (2019.01)

(58) Field of Classification Search
None
See application file for complete search history.

(56) References Cited

U.S. PATENT DOCUMENTS

| 5,283,897 | A | * | 2/1994 | Georgiadis | ............ | G06F 9/5083 711/151 |
| 7,206,848 | B1 | * | 4/2007 | Zara | ...................... | G06F 9/5027 707/999.009 |

(Continued)

OTHER PUBLICATIONS

Office Action for corresponding European Application No. 17150728.8 dated Nov. 26, 2018.
(Continued)

*Primary Examiner* — Jeff A Burke
(74) *Attorney, Agent, or Firm* — Harness, Dickey & Pierce, P.L.C.

(57) ABSTRACT

The invention provides for a database management system (100, 400) comprising a container management system (102). The container management system comprises: a container management system memory (106) for storing machine executable instructions (114) and a container management system processor (104). Execution of the machine executable instructions cause the container management system processor to repeatedly: receive (200) multiple database requests (116) via a first network connection (110), wherein each of the multiple database requests comprises metadata descriptive of the multiple database requests; calculate (202) a receiving rate (118) by counting the multiple database requests received in a predetermined duration; calculate (204) a processor count (120) using a predictive model and the receiving rate; determine (206) a number of data containers (122) using the receiving rate and a container memory model, wherein each of the data containers is a block of the container management system memory assigned by continuous address space; request (208) a processor pool from a processor hosting service (306) via a second network connection (112) to satisfy the processor count; allocate (210) data containers (128, 130, 132, 134) equal to the number of the data containers in the container management system memory; transfer (212) the multiple data base requests to the data containers as they are received, wherein each of the multiple data base requests is assigned to a chosen data container selected from the data containers using the metadata; and transfer (214) a filled data container selected from the number of data containers to the processor hosting service via the second network connection, wherein the filled data container is filled with the multiple data requests above a predetermined threshold.

20 Claims, 4 Drawing Sheets

(51) Int. Cl.
*G06F 16/23* (2019.01)
*G06F 16/901* (2019.01)

(56) References Cited

U.S. PATENT DOCUMENTS

| | | | | |
|---|---|---|---|---|
| 7,240,169 | B2* | 7/2007 | Dennie | G06F 9/5016 |
| | | | | 711/147 |
| 7,630,924 | B1* | 12/2009 | Collins | G06Q 50/22 |
| | | | | 235/380 |
| 8,276,141 | B2* | 9/2012 | Kaczynski | G06F 9/5055 |
| | | | | 718/100 |
| 8,315,187 | B1* | 11/2012 | White | H04L 47/6205 |
| | | | | 370/254 |
| 8,555,287 | B2* | 10/2013 | Ding | G06F 9/505 |
| | | | | 718/104 |
| 8,620,790 | B2* | 12/2013 | Priebatsch | G06Q 30/06 |
| | | | | 705/35 |
| 8,730,816 | B2* | 5/2014 | Carey | H04L 43/0823 |
| | | | | 370/237 |
| 8,972,465 | B1 | 3/2015 | Faibish et al. | |
| 9,076,156 | B2* | 7/2015 | Newnham | G06Q 30/02 |
| 9,262,490 | B2* | 2/2016 | Colrain | G06F 9/5027 |
| 2003/0046396 | A1* | 3/2003 | Richter | G06F 9/505 |
| | | | | 709/226 |
| 2007/0233603 | A1* | 10/2007 | Schmidgall | G06Q 20/02 |
| | | | | 705/51 |
| 2008/0077932 | A1* | 3/2008 | Ruppach | G06F 9/5038 |
| | | | | 718/105 |
| 2011/0225586 | A1* | 9/2011 | Bentley | G06F 9/466 |
| | | | | 718/101 |
| 2013/0166109 | A1* | 6/2013 | Ginsberg | G08G 1/0967 |
| | | | | 701/2 |
| 2013/0283293 | A1* | 10/2013 | Lagerblad | G06F 9/5033 |
| | | | | 719/314 |
| 2014/0089282 | A1 | 3/2014 | Sampathkumar | |
| 2014/0188868 | A1* | 7/2014 | Hunter | G06F 3/067 |
| | | | | 707/736 |
| 2015/0112871 | A1* | 4/2015 | Kumnick | G06Q 20/382 |
| | | | | 705/67 |
| 2015/0149514 | A1 | 5/2015 | Kim et al. | |
| 2015/0199404 | A1* | 7/2015 | Elias | G06F 16/2453 |
| | | | | 707/718 |
| 2015/0332295 | A1* | 11/2015 | Unser | G06Q 30/0202 |
| | | | | 705/7.31 |
| 2015/0370799 | A1* | 12/2015 | Kushmerick | G06F 16/285 |
| | | | | 707/740 |
| 2016/0048913 | A1* | 2/2016 | Rausaria | G06Q 40/02 |
| | | | | 705/39 |
| 2016/0283331 | A1* | 9/2016 | Barber | G06F 16/254 |
| 2016/0321352 | A1* | 11/2016 | Patel | G06F 16/1734 |
| 2018/0052765 | A1* | 2/2018 | Imbierski | G06F 12/023 |
| 2018/0053161 | A1* | 2/2018 | Bordash | G06Q 20/102 |
| 2018/0091393 | A1* | 3/2018 | He | H04L 43/065 |
| 2018/0121103 | A1* | 5/2018 | Kavanagh | H04L 47/805 |

OTHER PUBLICATIONS

European Search Report corresponding to European Application No. 17150728.8-1879 dated Jul. 20, 2017.

Xu Xiwei et al.: "The Blockchain as a Software Connector", 2016 13th Working IEEE/IFIP Conference on Software Architecture (WICSA), IEEE, XP032927547, Apr. 5, 2016, (Apr. 5, 2016), pp. 182-191.

* cited by examiner

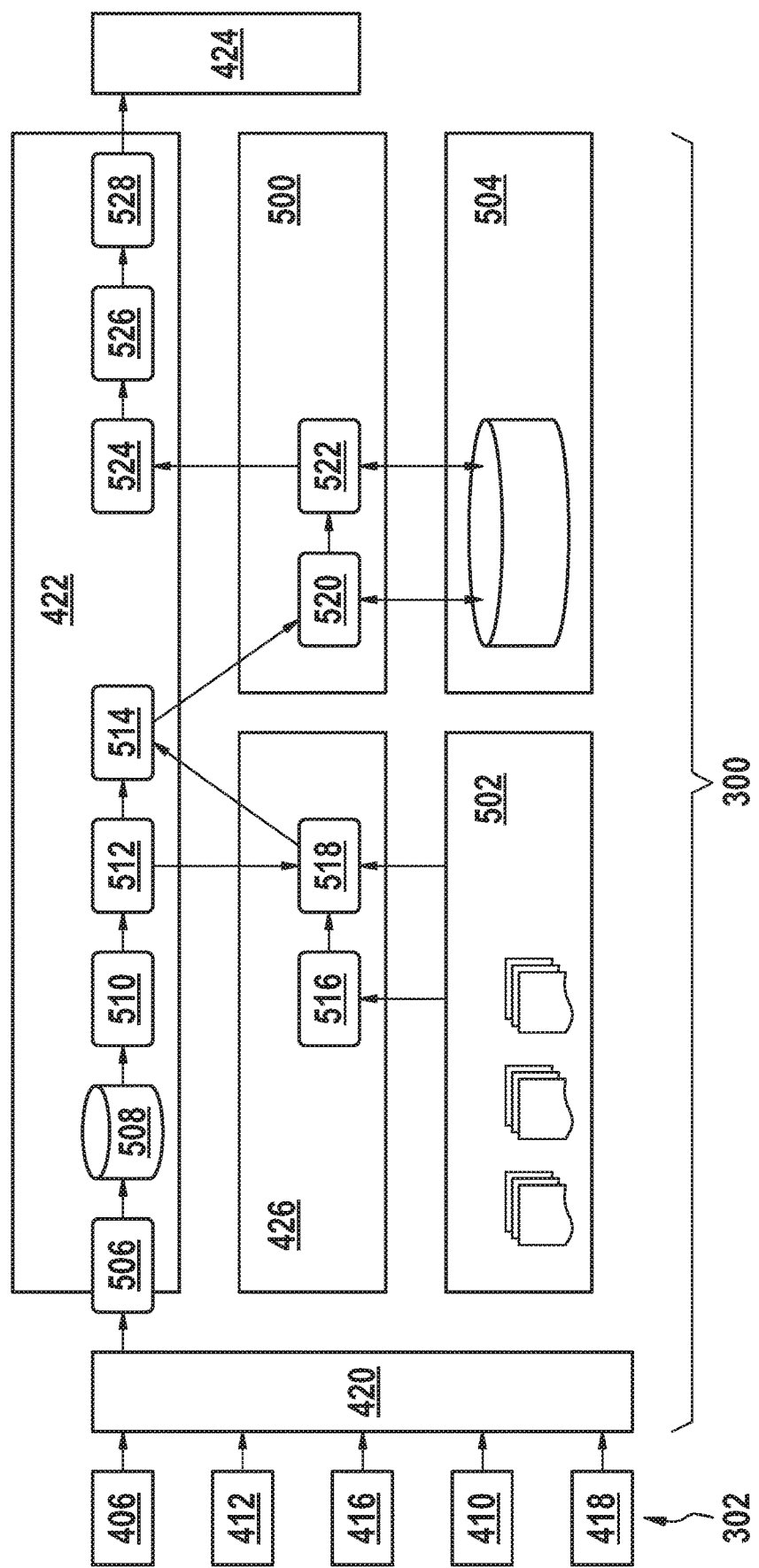

DATABASE MANAGEMENT SYSTEM WITH DYNAMIC ALLOCATION OF DATABASE REQUESTS

FIELD OF THE INVENTION

The invention relates to database management systems.

BACKGROUND AND RELATED ART

Database management system is a computer system that may be used to interact with a user or other applications to provide access to one or more database systems. Database management systems often provide a means for enabling different types of clients applications and databases to work together cooperatively.

SUMMARY

The invention provides for a database management system, a computer program product, and a method in the independent claims. Embodiments are given in the dependent claims.

In one aspect the invention provides for a database management system comprising a container management system. A container management system is a memory management system for sorting and grouping database requests into containers or blocks of memory. The container management system comprises a container management system memory for storing machine-executable instructions. The container management system further comprises a container management system processor. References to a processor herein are understood to also refer possibly to multiple cores and/or processors. The processors may be present within a single machine or may be distributed within a group or cluster of machines that operate cooperatively.

Execution of the machine-executable instructions cause the container management system processor to repeatedly receive multiple database requests via a first network connection. Each of the multiple database requests comprises meta data descriptive of the database requests. The meta data could for example be descriptive of the type of request, the type of databases or data which are requested to be operated on or request data from, or may even contain information about the subject matter of the individual database requests. Execution of the machine-executable instructions further causes the container management system processor to repeatedly calculate a receiving rate by counting the multiple data requests received in a predetermined duration. The predetermined duration may for example be used to measure the number of database requests received in a particular time interval. In some examples the predetermined duration may be blocks of time which are looked at discreetly. In other examples the receiving rate could be a moving average that is calculated on a continual basis preceding a particular time.

Execution of the machine-executable instructions further cause the container management system processor to repeatedly calculate a processor count using a predictive model and the receiving rate. The processor count as used herein is an estimate of the number of processors needed to process the number of multiple database requests. In some examples the receiving rate could be a value which is used to look up a processor count in a lookup table. In other examples the predictive model may be more complicated. For example the predictive model may take the receiving rate at a variety of time intervals and use this to better predict the necessary processor count. For example the receiving rate could briefly spike up and then lower again. The predictive model could be a mathematical function which is used to approximate a curve or the predictive model could also be more complicated such as a neural network. In some simpler examples the predictive model could be a look up table that could possibly be determined empirically.

Execution of the machine-executable instructions further causes the container management system processor to determine a number of data containers using the rate of requests and a container memory model. Each of the data containers is a block of the container management system memory assigned by continuous address space. The data containers as used herein are these blocks of memory which are used to store the multiple database requests as they are received. In some instances the container memory model may be fairly simple and may be just directly scaled by the rate of requests. In other examples the container memory model may be more sophisticated in that it may take into account the type of meta data that has been received with the multiple database requests. For example the data containers could be used to sort the type or destination of various database requests.

Execution of the machine-executable instructions further causes the container management system processor to repeatedly request a processor pool from a processor hosting service via a second network connection to satisfy the processor count. The processor hosting service is a system which manages or provides access to computing resources. These computing resources may for example, may be either real or virtual machines which are then provided or configured to process the multiple database requests. The elements within a processor pool may in some instances be processors within a single machine or virtual machine. In other examples the processor pool may be multiple machines or virtual machines which are provided. Execution of the machine-executable instructions further causes the container management system processor to repeatedly allocate the number of data containers in a container management system memory.

Execution of the machine-executable instructions further causes the container management system processor to repeatedly transfer the multiple database requests to the data containers as they are received. Each of the multiple database requests is assigned to a chosen data container selected from the data containers using the meta data. In this step the multiple database requests are effectively sorted into the different data containers based on the meta data that they have. Depending upon the rate at which the multiple database requests are received the sorting may in some examples be performed differently. For example if the number of multiple database requests is extremely low the system could simply allocate one or very few data containers. In this instance variable sorting may be taking place. As the number of the multiple data requests increases the multiple database requests can be more effectively sorted. For example they can be sorted by the destination database for which the database request is intended. The subject matter may also be used to sort the multiple database requests.

The above steps which are described as being performed repeatedly therefore define a dynamic process that is able to adapt to a changing in the receiving rate of the multiple database requests. As the receiving rate rises and falls more data containers can be allocated or not replaced as they are filled and transferred to the processor hosting service. Additionally the container management system may also adjust the processor pool provided by the hosting service dynamically by repeatedly sending updated requests to the hosting service.

Execution of the machine-executable instructions further cause the container management system to repeatedly transfer a filled data container selected from the number of data containers to the processor hosting service via the second network connection. The filled data container is filled with the multiple data requests above a predetermined threshold. As the data containers are filled they are then transferred to the processor hosting service for processing by the processor pool. This may result in more efficient computational processing of the multiple database requests. The sorting operation enables the multiple database requests to be grouped so that they can be more effectively processed by individual processors in the processor pool.

In another embodiment the database management system further comprises the hosting service. The processor hosting service comprises multiple processor groups. The processor pool comprises the multiple processor groups. Each of the multiple processor groups comprises multiple processors and a shared memory. That is to say each of the multiple processor groups has multiple processors and they are all able to operate on a shared memory. This enables the processors to work cooperatively on a filled data container. The processor hosting service is configured for allocating a portion of the multiple processor groups to the container management system. This provides the processor pool.

In another embodiment the container memory model is configured for formatting the multiple data requests into a page of memory for the shared memory for use by the processor group. Transferring the multiple data requests to the data containers as they are received comprises formatting the multiple data requests into the page of memory using the container memory model. This embodiment may be advantageous because it saves on the amount of work to group related database requests and have them processed together. As the multiple database requests are received they are stored together but they are also at the same time put into the proper format for use by the processor group. The multiple data requests are placed into the proper format so that they need only be transferred via the network connection and then directly transferred into the operating memory which can be used directly by the processor group. This results in a huge computational gain in processing large numbers of multiple database requests. The pre-sorting of the multiple database requests and placing them into the proper memory format enables an acceleration of the processing.

In another embodiment each of the multiple processor groups is configured as one or more virtual computer systems.

In another embodiment the hosting service assigns a job token to each of the multiple processors when the page of memory is transferred into the shared memory. The job token of each of the multiple processors assigns a portion of the shared memory to each of the multiple processors for processing the multiple data requests. Upon completion of the multiple database requests within a portion of the shared memory any one of the following is performed: the job token is modified to reassign a corresponding processor of the multiple processors to a new portion of the shared memory, the job token is modified to reassign the corresponding processor to a different pool of processors, and the job token is deleted to release the corresponding processor. The job tokens are a means of locking the processors so that they only operate on the portion of the page of memory that is assigned to them. This provides a means of managing and controlling how the processors distribute the task of d processing the multiple database requests.

In another embodiment the multiple processors are configured for generating database transaction requests using the multiple database requests. The multiple processors route the database transaction requests to two or more databases using a third network connection.

The multiple processors are configured for receiving a confirmation or failure of each of the database transaction requests via the third network connection. This is beneficial because the database management system can see or track if the database transaction requests corresponding to a particular database request was successfully completed or not.

In another embodiment the multiple processors are configured for writing the confirmation or failure of each of the database transaction requests periodically in a block chain log. This may be beneficial because it provides a means of logging the confirmation or failure of a large number of database transaction requests in a form which cannot be modified.

In some examples the database transaction request itself is written in the block chain log. In other examples the database transaction request and the identifier for the corresponding database request is also recorded in the block chain log. In yet other examples an identifier of the database request or the database request itself corresponding to the database transaction request is stored instead in the block chain log.

In another embodiment the database management system further comprises an interface system for connecting to multiple clients. The interface system is configured for receiving application requests from the multiple clients via a fourth network connection. The interface system is configured for transforming the application requests into the multiple database requests and the meta data. The interface system comprises a completion log for logging each of the application requests. The interface system is configured for repeatedly searching the block chain log for confirmation or a failure of each of the application requests. The interface system is configured for reporting the confirmation or the failure to the multiple clients upon finding the confirmation or the failure within the block chain log. This embodiment may be beneficial because it may provide for an efficient means of providing confirmation or failure of a database request instead of needing to individually track each of the database requests and its corresponding database transaction request the results can simply be written in the block chain log. Other portions of the database management system can then periodically search for a record confirming or indicating a failure of a particular database transaction request and/or the corresponding database request.

In another embodiment the memory block management system is configured for sorting the multiple database requests at least particularly according to a set of predetermined rules. For example for a particular receiving rate there may be rules which can be recalled which indicate how many data containers should be allocated and possibly as well as how the data should be routed to the various data containers.

In another embodiment the database management system is configured for sorting the multiple database requests at least partially according to a subset of the predetermined rules. The subset is selected using the receiving rate.

In another embodiment the memory block management system is configured for sorting the multiple database requests at least partially using an automatic binning algorithm to uniformly distribute the multiple database requests to the data containers. The use of an automatic binning algorithm may be effective because it is desirable to sort the multiple database requests so that the processor processes them efficiently but that also the load to the various processors is also balanced. This can be achieved by distributing them uniformly within the data containers.

In another embodiment the automatic binning algorithm is any one of the following: a neural network, a cluster analysis algorithm, a principle components analysis algorithm, a decision tree sorting algorithm, a deep learning algorithm, a machine learning algorithm, and combinations thereof.

In another embodiment the database management system is a payment processing system.

In another aspect the invention provides for a non-transitory computer-readable storage medium for storing machine-executable instructions for execution by a processor controlling the container management system of a database management system. Execution of the machine-executable instructions cause the container management system processor to repeatedly receive multiple database requests via a first network connection. Each of the multiple database requests comprises meta data descriptive of the multiple database requests. Execution of the machine-executable instructions further cause the container management system processor to repeatedly calculate a receiving rate by counting the multiple database requests received in a predetermined duration. Execution of the machine-executable instructions further cause the container management system processor to repeatedly calculate a processor count using a predictive model and the receiving rate.

Execution of the machine-executable instructions further cause the container management system processor to repeatedly determine a number of data containers using the rate of requests and a container memory model. Each of the data containers is a block of the container management system memory assigned by continuous address space. Execution of the machine-executable instructions further cause the container management system processor to repeatedly request a processor pool from a processor hosting service via the second network connection to satisfy the processor count. Execution of the machine-executable instructions further cause the container management system processor to allocate the number of the data containers in the container management system memory. Execution of the machine-executable instructions further cause the container management system processor to repeatedly transfer the multiple database requests to the data containers as they are received. Each of the multiple database requests is assigned to a chosen data container selected from the data containers using the meta data. Execution of the machine-executable instructions further cause the container management system processor to repeatedly transfer a filled data container selected from the number of data containers to the processor hosting service via the second network connection. The data container is filled with the multiple data requests above a predetermined threshold.

In another aspect the invention provides for a method of operating a database management system comprising a container management system. The method comprises repeatedly receiving multiple database requests via a first network connection. Each of the multiple database requests comprises meta data descriptive of the multiple database requests. The method further comprises repeatedly calculating a receiving rate by counting the multiple database requests received in a predetermined duration. The method further comprises repeatedly calculating a processor count using a predictive model and the receiving rate. The method further comprises repeatedly determining a number of data containers using the rate of requests and a container memory model. Each of the data containers is a block of the container management system memory assigned by continuous address space. The method further comprises repeatedly requesting a processor pool from a processor hosting service via a second network connection to satisfy the processor count. The method further comprises repeatedly allocating the number of the data containers in the container management system memory. The method further comprises repeatedly transferring the multiple database requests to the data containers as they are received. Each of the multiple database requests is assigned to a chosen data container selected from the data containers using the meta data. The method further comprises repeatedly transferring a filled data container selected from the number of data containers to the processor hosting service via the second network connection. The filled data container is filled with the multiple database requests above a predetermined threshold.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the Internet, or over a local area network.

'Computer memory' or 'memory' is an example of a computer-readable storage medium. Computer memory is any memory which is directly accessible to a processor. 'Computer storage' or 'storage' is a further example of a computer-readable storage medium. Computer storage may be any volatile or non-volatile computer-readable storage medium.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the C programming language or similar programming languages and compiled into machine executable instructions. In some instances the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

In the following embodiments of the invention are explained in greater detail, by way of example only, making reference to the drawings in which:

FIG. 5 illustrates a portion of a further example of a database management system.

DETAILED DESCRIPTION

Like numbered elements in these figures are either equivalent elements or perform the same function. Elements which have been discussed previously will not necessarily be discussed in later figures if the function is equivalent.

Figure 1:
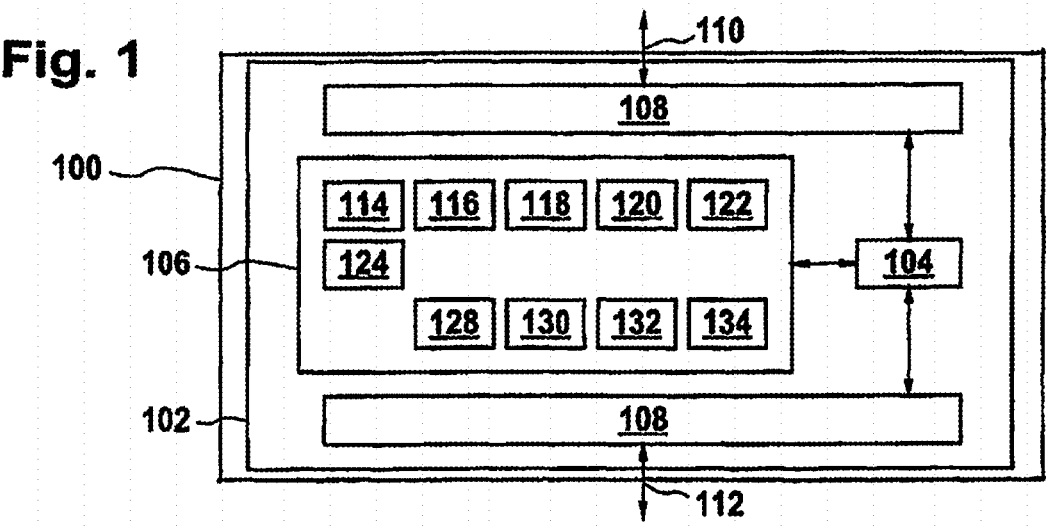
FIG. 1 illustrates an example of part of a database management system.

FIG. 1 illustrates an example of a container management system 102 that is part of a database management system 100. The container management system 102 is seen as being implemented as a computer which comprises a container management system processor 104. The container management system processor 104 is connected to a container management system memory 106 and a network adaptor 108. The network adaptor 108 is configured for establishing a first network connection 110 and a second network connection 112.

The container management system memory 106 is shown as containing machine-executable instructions 114 which enable the container management system processor 104 to perform various functions. The container management system memory 106 is further shown as containing multiple database requests 116 that have been received via the first network connection. The multiple database requests 116 have been placed into a standard format and comprise meta data which is descriptive of each individual database request. The container management system memory 106 is further shown as containing a receiving rate 118. The receiving rate is calculated by counting the number of multiple database requests 116 in a predetermined duration. The container management system 106 is further shown as containing a processor count 120 that was determined using a predictive model and the receiving rate 118. The predictive model for example could be implemented by the machine-executable instructions 114.

The container management system memory 106 is further shown as containing a number of data containers 122. The number of data containers 122 is a value which is calculated using the receiving rate 118 and a container memory model.

The container memory model may also be implemented by the machine-executable instructions 114.

The container management system memory 106 is further shown as containing a processor pool request 124 that can be sent via the second network connection 112 to a hosting service which is not shown in this Fig. The processor pool request 124 requests processors from the hosting service that will satisfy the processor count 120.

The container management system memory 106 is further shown as containing a number of data containers 128, 130, 132, 134. The data containers are container management system memory 106 which has been allocated and has a continuous address space. The use of the continuous address space makes it easy to copy the entire container 128, 130, 132, 134 and send it out via the second network connection 112 to the hosting service for processing. As the multiple database requests 116 are received they are then transferred and stored in one of the data containers 128, 130, 132, 134. The data container 128, 130, 132, 134 is selected by using the meta data of the individual database request 116.

Figure 2:
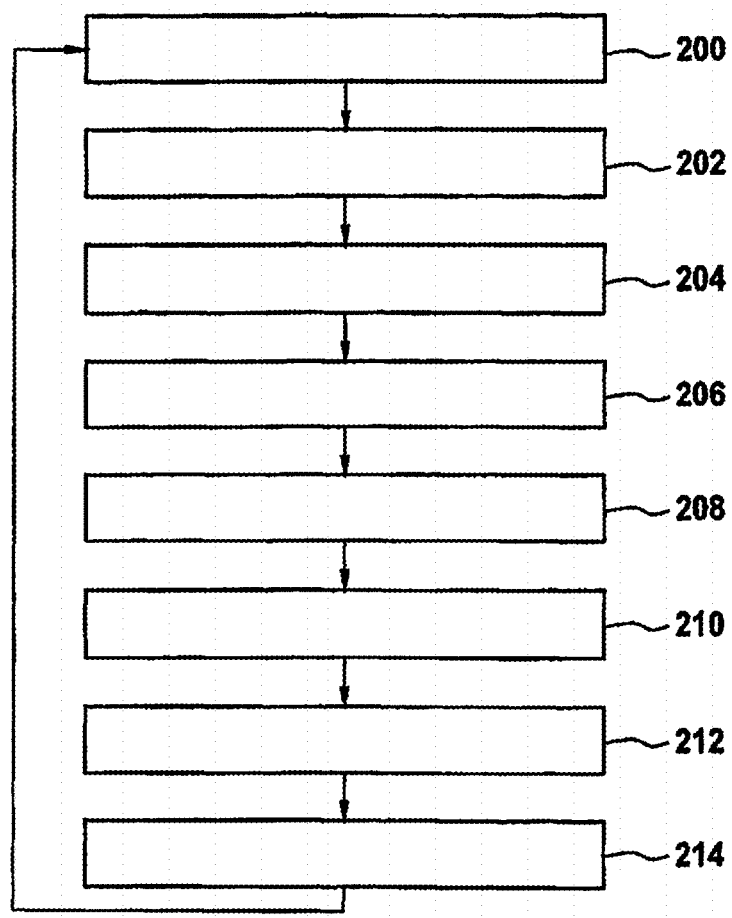
FIG. 2 shows a flow chart which illustrates a method of using the database management system of FIG. 1.

FIG. 2 shows a flowchart which illustrates a method of operating the database management system 100 illustrated in FIG. 1. First in step 200 the multiple database requests 116 are received via the first network connection 110. Next in step 202 the receiving rate 118 is calculated repeatedly by counting the multiple database requests received in a predetermined duration. Next in step 204 the processor count 120 is calculated using a predictive model and the receiving rate 118. Then in step 206 the number of data containers is determined using the receiving rate and a container memory model. Then in step 208 the processor pool is requested by sending the processor pool request 124 via the second network connection 112. Then in step 214 when one of the containers 128, 130, 132, 134 is filled above a predetermined threshold it is transferred via the second network connection 112 to the hosting service. In FIG. 2 there is an arrow showing that the method proceeds back to step 200. The arrow is intended to represent that each of the steps detailed above may be repeated multiple times. For example the receiving rate may be calculated and monitored continually and the number of data containers may be adjusted accordingly. Also after a data container has been filled the system may look at the receiving rate and determine if the filled data container should be replaced and if it is replaced it should be replaced by additional data containers 128.

Figure 3:
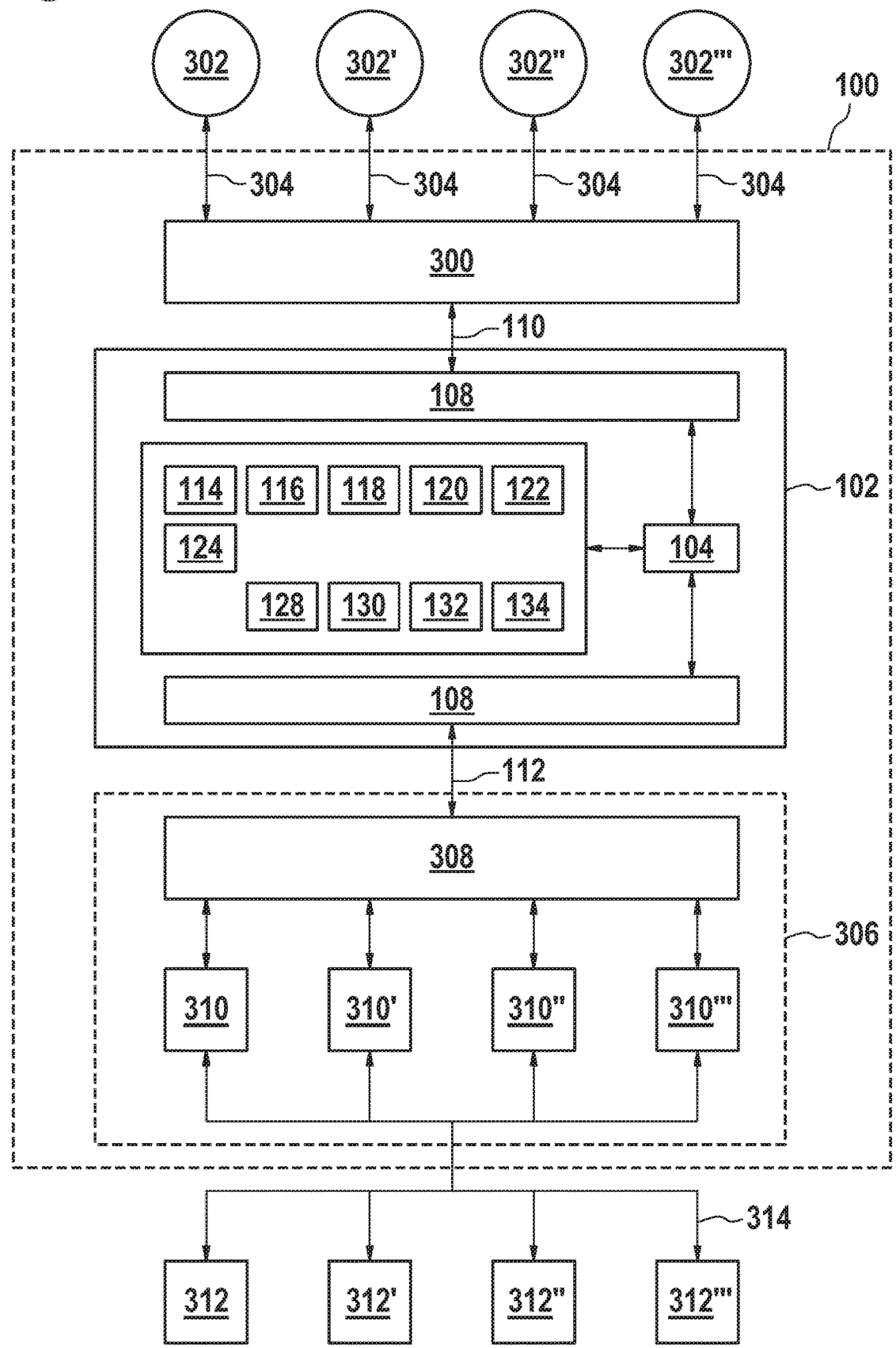
FIG. 3 illustrates a further example of a database management system.

FIG. 3 illustrates another example of a database system 100. In this example the container management system 102 is shown as being connected to an interface system 300 via the first network connection 110. The interface system 300 is configured for connecting to multiple clients 302, 302', 302", 302'" via a fourth network connection 304. The multiple network connections labeled 304 are intended to represent various network configurations. The various third network connections 314 may represent a single network connection or may represent a collection of diverse network connections.

The clients 302, 302', 302", 302'" could for example be machines hosting applications which generate one or more of the multiple database requests 116. These requests are then transferred to the interface system 300 which then places them into a standardized form and generates the meta data. As this proceeds they are then passed via the first network connection 110 to the container management system 102.

The database management system 100 is also shown as containing a processor hosting service 306. The processor hosting service 306 may be external to the database management system 100 but in this example it is shown as being logically connected. The processor hosting service 306 comprises a host manager 308 for managing the operation of the processor hosting service 306 any number of virtual machines 310, 310', 310", 310'". A virtual machine may correspond to a processor group assigned or allocated by the hosting service. When the host manager 308 receives the processor pool request 124 it allocates the appropriate number of virtual machines 310, 310', 310", 310'" to satisfy this processor pool request 124. The virtual machines 310, 310', 310", 310'" may logically contain one or more processors which are organized such that they each have one or more processor groups. Each of the processor groups shares a shared memory. When a container 128, 130, 132, 134 is filled it is passed via the second network connection 112 and then onto one of the virtual machines 310, 310', 310", 310'". Processors within the processor pool then operate on the database requests transforming them into database transaction requests which are individually sent to the appropriate database system 312, 312', 312", 312'" for processing via a third network connection 314. The network connection labeled 314 are intended to represent various network configurations. The various third network connections 314 may represent a single network connection or may represent a collection of diverse network connections.

Real world processes using database systems today typically require integration between various systems both inside and outside an enterprise. The Real world mass payments of companies spans across multiple systems over an on premise and on demand systems in a heterogeneous network. Examples may support mass data payments by executing them in real time.

Blockchain, the shared ledger technology which allows any participant in a network to see the system of record will have a transformative impact on a number of industries. Participants in networks are all maintaining their own traditional ledgers to record transactions between them within their ecosystems. Despite efforts to reduce the complexity and increase the interconnectedness of these systems through investment in integration and B2B technologies, network participants are still typically swapping files of data between them. As a result, the processes to underpin asset ownership and asset transfer in business networks are frequently inefficient, expensive and vulnerable.

Blockchain holds the potential for all participants in a network to share a system of record. This replicated, shared ledger will provide consensus, provenance, immutability and finality around the transfer of assets within business networks—reducing costs, complexity and time, underpinning shared, trusted processes, enabling trusted recordkeeping and improving discoverability.

The context for the use case is focused on saving computational resources which may result in saving time and money for processing database transactions such as international payments. Examples may provide a way to send a real money payment from one system to an international counterpart in near real time.

The below are some challenges for an Organization in doing Real Time Payments.

Complex Enterprise System Landscape

No unified Payment Governance process across the Enterprise

Complex bookkeeping

Lack on Efficiency in regulatory compliance

Many Point to Point Communication

Complex System Landscape with many Payment Interfaces

Lack of Flexibility & Scalability

Higher TCO and High Risk

Unnecessary Data Replication, Data uploads

No Unified Payment Reporting

Higher Data Load across the entire system landscape

Lack of User Simplicity

Examples may provide a way to avoid payment delays in the Enterprise landscape and maintain the needed Data Security & Data Integrity for doing Real time payments using Block chain.

In one example, the high-level architecture is described. The User requests are received via different Interactive channel like System, Mobile, ATM, Watch, Devices, POS Terminal . . . etc., The User Credentials are verified by Application Router (based on Auth Tokens) and Requests are forwarded to Abstraction Layer. If the verification is successful means further steps will be processed. The User Requests are tagged with a specific Session ID & a Token ID.

The Data Processing Engine in the Abstraction Layer gets the Data and does some Standardization, enrichment & Validation (based on Rules), after that it cleanses the data and checks for any matching/duplicates in the dataset and it merges the identified records and load the same to the Asynchronous Queue (as described below in FIG. 5).

The Abstraction Layer converts the request to JSON Format and sends to Asynchronous queue for further processing. The Asynchronous queue has different transactions from different interactive channels for further processing. The transactions are coming to the Asynchronous queue after relevant Approvals (Automated or Manual based on some predefined Rules). When the Transactions are approved means it is locked for further changes. Each Transaction from the queue is validated & verified sequentially by Rule Engine for any Anomalies and allowed for further processing in the pipeline (Ex. Limit checking . . . ). The priority of the transaction is changed based on the Predefined Rules (like Interactive channel source, User Profile, Created System etc. . . . ).

The transactions are passed to the Matching Engine which checks for any matching with the List of Blocked Accounts with the given set of Evaluation criteria. The Classifier gives a priority rating for each transaction based on some predefined conditions and packages the different transactions into different Buckets/Clusters. The different Buckets/Clusters are given to the container management component. The container management component runs multiple parallel transaction Buckets/Clusters in different containers in a secured manner.

Based on the number of Clusters the Container Management layer creates the number of needed containers for Parallel Processing of the different Clusters in a concurrent manner. The Container Management identifies the needed Memory, Processing Units, and parallel Threads etc. in runtime and creates the needed runtime dynamically for Parallel execution. This provides the needed adaptiveness, avoids sticky sessions, Elasticity, Scalability, efficient Resource utilization and the needed Performance.

The container management layer handover the transaction Buckets to Payment Engine. The Payment Engine sorts out different Transaction Buckets to different types of payment methods and sends the details to the Messaging Layer (in packets).

The Payment Engine helps to centralize the decision making for payments in the architecture. It decides how to send payments to different payment networks, payment platforms etc., this help to centralize these rules and allows for a scalable Routing method.

Holding the rules for payment flows and routing (payment orders)

Converting internal payment formats to the agreed upon format

Sending payment messages to the different Connected environment

Providing payments APIs and services to other participants in the system landscape.

The Messaging Layer adds the details of the IP Address and Port details (Dynamic Tunnelling) to every Transaction packet and sends the details to the Connectivity Layer. With the connection Details, the Infrastructure technical connectivity is dynamically established using the Technical users and with the needed Authorization rights which is created dynamically based on the transaction context (based on the network to be connected). The Connectivity Layer connects to the different Payment Networks, Payment Platforms & Payments Gateways (using Block chain) based on the Connectivity details in the Message Header of the Transaction Packet/bucket.

When the Connectivity is successfully established and Payment Details are Successfully Transferred, the Payments are processed by the corresponding Payment System. When the Payment processing is Successful, the information is transferred to the Backend System. The Request is passed to the user which invalidates the Current User session and the Transaction session context is closed leaving the remote and main databases in a mutually consistent state (if the databases are different) and the connection with the different remote systems are closed & released. Finally the Successful Logout confirmation is given to User. The User session is invalidated with inactivity also within the configured Threshold time.

All the above framework components are running inside in a Database for faster processing.

Figure 4:
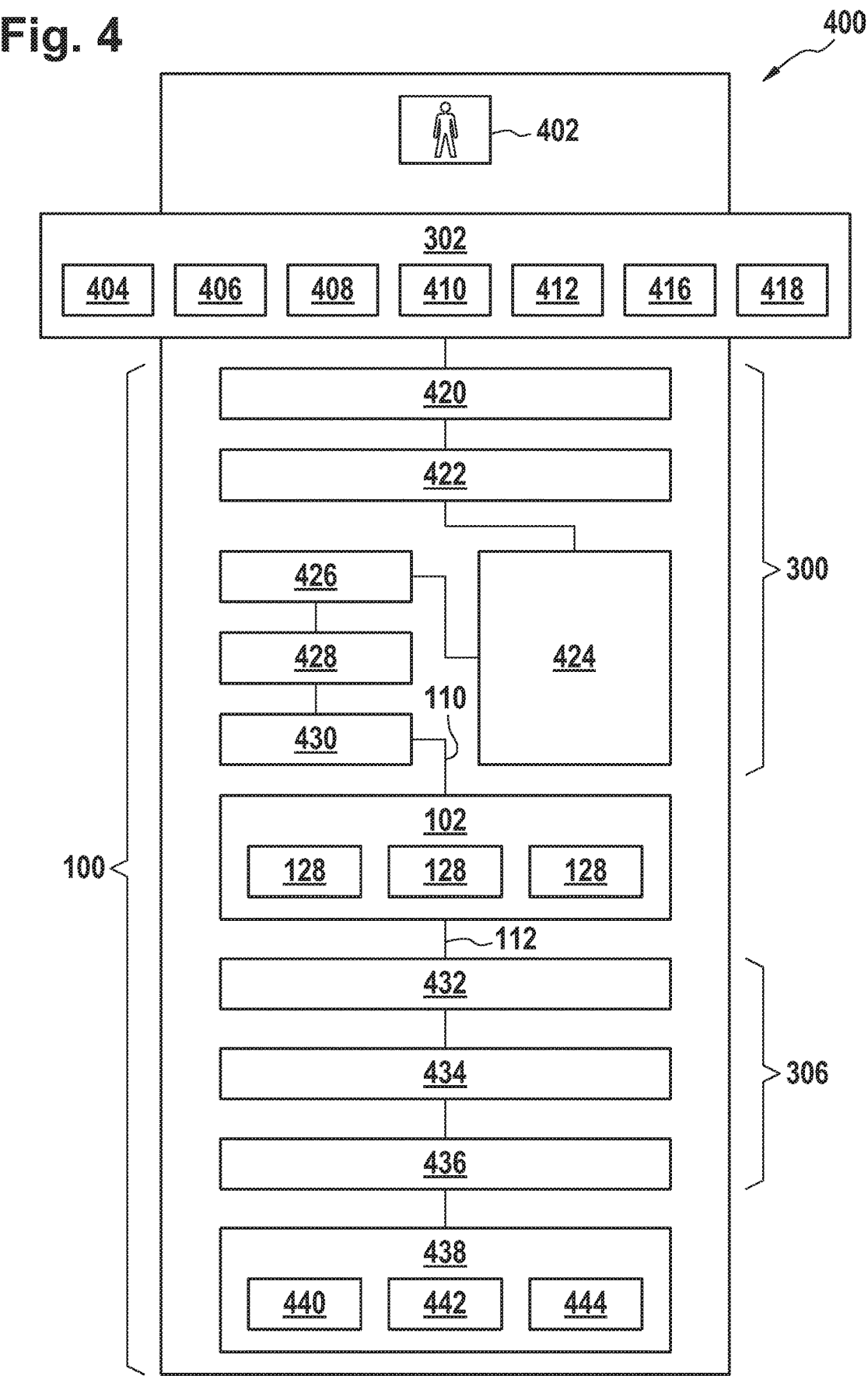
FIG. 4 illustrates a further example of a database management system.

FIG. 4 shows a practical implementation of the above described system by adapting the database management system 100 of FIG. 3. The database management system 400 show in FIG. 4 does not show individual machine components but shows the construction of the system in logical and functional terms. In the Fig. an end user 402 can use any number of clients 302, 302', 302", 302''' to initiate a payment. The examples of payments shown are Alexa Voice 404, a UI application 406, a smart watch application 408, a POS terminal 410, a mobile device 412, an ATM 416, and also other sources 418. The interface system 300 is shown as comprising logically an application router 420, an abstraction layer 422, an asynchronous queue 424, a rule engine 426, a matching engine 428, and a classifier 430. The first network connection 110 is shown as connecting the classifier 430 to the container management system 102. The second network connection 112 shows the connection between the container management system 102 and a payment engine 432 of the processor hosting service 306. Functionality implemented by the processor hosting service 306 is shown to be a payment engine 432, a messaging layer 434, and an infrastructure connectivity layer 436.

This example is also further shown as containing a block chain network 438 which has a payment network 440, record of payments for a bank 442, and various payment platform records 444. The block chain network 438 may be used to store the success or failure of the various payments. The abstraction layer 422 may for example contain a record or log on a particular database request until it is seen as being published in the block chain network 438. Information published in the block chain network 434 may then be used to report back to the clients 302, 302', 302'', 302''' on the success or failure of a particular payment.

Although the features of FIG. 4 are shown in the context of a payment system they are however generally applicable to database systems in general.

The use of the blockchain functionality depicted in FIG. 4 may have one or more of the following advantages:
Improved bookkeeping
Consolidated audit trail
Faster clearing and settlement
Ledger consolidation
Operational improvements
More efficient regulatory compliance and provide Full transparency
Leverage common Technical infrastructure
Reducing Point to Point Communication
Reducing Data Replication Time
Reduce system landscape Complexity and Easier to maintain
Maximize End User Adoption with unified Payment Governance Process
Substantial System Landscape Simplification by eliminating Interfaces
Higher Flexibility & Scalability
Lower TCO and Low Risk
Avoiding unnecessary Data Replication, Data uploads
Unified Payment Reporting
Reduced Data Load across the entire system landscape
User Simplicity
Speed time-to-insight and action by allowing business users to directly access, manage, and visually interact with Payment Processing data.
Single source of Truth
Real time Business process Integration
Data Integrity and Interoperability
Process Optimization
Fast and efficient: Scale up or down in minutes, elastic capacity provisioning
Adaptiveness, efficient Resource utilization and Improved Performance.

The Abstraction layer has the Data Processing Engine Component where the Data is staged temporarily, validated, cleansed, matched and loaded in the Asynchronous Queue. The validation is done based on different Rules maintained in the system for Data Processing. The Matching is done to identify the transactions which can be combined together as a single transaction for further processing based on the details in the transaction (based on common set of matching field values). Creating a technical user for every application user in runtime and assigning the access rights to different application areas by the Application Router using the JSON token. The DB access rights for the Technical user is assigned based on the application user rights dynamically so that the tech user has the necessary privileges to access and execute the DB Queries. The session ID of the Application user is passed to the tech user to make sure to bind the Application user context to the tech user context.

The Application User id is passed (along with other parameters) when the tech user is querying the DB so that the specific results relevant to that user are retrieved from the database. This helps to avoid the tight coupling of the User session with the Backend system.

FIG. 5 shows a chart which shows an implementation of the interface system 300 in logical terms. In this example the interface system 300 is shown as containing an application router again 420 which is connected to multiple clients 302, 302', 302'', 302'''. The application router 420 is connected to an abstraction layer 422. The abstraction layer can communicate with an asynchronous queue 424 and a rule management 426 and data cleaning 500 module. The system is further shown as containing a rule database 502 and also a collection of reference data and cleaning repositories 504.

The abstraction layer 422 is shown as receiving data from the application router 420 via a data interface 506. The data interface then buffers data in a staging 508 buffer. The abstraction layer 422 then removes and abstracts data 510. This is then passed onto a completion and enrichment module 512. The completion and enrichment module 512 passes data onto a validation module 514 and also a rule module 518 of the rule management system 426. The rules are provided by a workflow 516 and also the rule database 502. The rules 518 are provided to the validation module 514. The validation module 514 receives data from the completion and enrichment module 512 and the rule module 518. The validation module 514 then passes data to the data cleansing portion 500. This is passed to a data cleansing module 520. The data cleansing module receives data from the reference data and cleansing repositories 504. It then passes data to the matching module 522. The matching module then passes the data back to the abstraction layer 422 to a survivorship and merge layer 524. The survivorship and merge layer 524 then passes the data onto an evaluation and augmentation module 526. The evaluation and augmentation module 526 then passes the data off to a load 528, which then passes the data onto the asynchronous queue 424.

The container Management layer gets the number of Clusters to be executed in parallel. Based on the number of Clusters the Container Management layer creates the number of needed containers for Parallel Processing of the different Clusters in a concurrent manner. Each cluster is getting processed in a separate container in a secured manner based on the different processing option in the data.

The Container Management identifies the needed Memory, Processing Units, and parallel Threads etc. in runtime and creates the needed runtime dynamically for Parallel execution. This provides the needed adaptiveness, avoids tight coupling of user sessions with the backend systems, Elasticity, Scalability, efficient Resource utilization and the needed Performance. If the execution of a cluster in a container is completed means the resources are automatically freed up and it is allocated to the needed container for faster processing.

The container management layer handover the transaction Buckets to Payment Engine. The Payment Engine sorts out different Transaction Buckets to different types of payment methods and sends the details to the Messaging Layer (in packets).

The User Login's to the Application from different interactive channels like System, Mobile, ATM, Watch . . . , etc. The User Credentials are verified by Application Router and Requests are forwarded to Abstraction Layer. If the verification is successful means further steps will be processed and if the verification is failure means the user will be notified. The Abstraction Layer converts the request to JSON Format and sends to Asynchronous queue for further processing.

The Abstraction layer has the Data Processing Engine Component where the Data is staged temporarily, validated, cleansed, matched and loaded in the Asynchronous Queue. The validation is done based on different Rules maintained in the system for Data Processing. The Matching is done to identify the transactions which can be combined together as a single transaction for further processing based on the details in the transaction (based on common set of matching field values).

Asynchronous Queue has the Transactions List from different channels (After Approval of Transactions). Each Transaction is validated & verified by Rule Engine for any Anomalies and allowed for further processing in the pipeline (Ex. Limit checking . . . ). The Matching Engine checks for any matching with the List of Blocked Accounts with the given set of Evaluation criteria. The Classifier gives a priority rating for each transaction based on some predefined conditions.

The container management component runs multiple parallel transactions in different containers in a secured manner. The container management layer handover the transactions to Payment Engine. The Payment Engine sorts out different Transaction Types to different types of payment methods and sends the details to the Messaging Layer (in packets). The Messaging Layer adds the details of the IP Address and Port details (Dynamic Tunneling) to every Transaction packet and sends the details to the Connectivity Layer.

The Connectivity Layer connects to the different Payment Networks, Payment Platforms & Payments Gateways (using Block chain) based on the Connectivity details in the Message Header of the Transaction Packet. When the Connectivity is successfully established and Payment Details are Successfully Transferred the Payments are processed by the corresponding Payment System. When the Payment processing is Successful the information is transferred to the Backend System. The Request is passed to the user which invalidates the Current User session and the Transaction session context is closed leaving the remote and main databases in a mutually consistent state (if the databases are different) and the connection with the different remote systems are closed & released. Finally the Successful Logout confirmation is given to User. The User session is invalidated with inactivity also within the configured Threshold time.

The database management system implemented as a Payment Integration platform may offer one or more of the following benefits:
  Message Queuing & Data Tracking
  Error Handling & Resend Capabilities
  Central Logging
  Authorization Management
  Central Rules Management
  Automation of Enrichment & Augmentation
  Automation of Validation & Matching
  Workflow Management for payment approval processes
  Reporting & Analysis Capabilities

LIST OF REFERENCE NUMERALS 100 database management system
102 container management system
104 container management system processor
106 container management system memory
108 network adaptor
110 first network connection
112 second network connection
114 machine executable instructions
116 multiple database requests
118 receiving rate
120 processor count
122 number of data containers
124 processor pool request
128 data container
130 data container
132 data container
134 data container
200 receive multiple database requests via a first network connection, wherein each of the multiple database requests comprises metadata descriptive of the multiple database requests
202 calculate a receiving rate by counting the multiple database requests received in a predetermined duration
204 calculate a processor count using a predictive model and the receiving rate
206 determine a number of data containers using the receiving rate and a container memory model
208 request a processor pool from a processor hosting service via a second network connection to satisfy the processor count
210 allocate the number of the data containers in the container management system memory
212 transfer the multiple data base requests to the data containers as they are received
214 transfer a filled data container selected from the number of data containers to the processor hosting service via the second network connection
300 interface system
302 client
302' client
302" client
302'" client
304 fourth network connection
306 processor hosting service
308 host manager
310 virtual machine
310' virtual machine
310" virtual machine
310'" virtual machine
312 database system
312' database system
312" database system
312'" database system
314 third network connection
400 payment system
402 end user
404 Alexa voice
406 UI Application
408 watch apps
410 POS terminal
412 mobile device
416 ATMs
418 Other Sources
420 Application router
422 Abstraction Layer
424 Asynchronous Queue
426 Rule Engine
428 Matching Engine
430 Classifier
432 Payment Engine
434 Messaging Layer
436 Infrastructure Connectivity Layer
438 Block chain network
440 Payment Network
442 Payments for Bank
444 Payment Platforms
500 data cleaning
502 rule database
504 reference data/cleaning repositories
506 Data Interface
508 Staging 510 Extract
512 Completion/Enrichment
514 Validation
516 Workflow
518 Rules
520 Data Cleansing
522 Matching
524 Survivorship/Merge
526 Evaluation/Augment
528 Load

The invention claimed is:

1. A database management system comprising a container management system, wherein the container management system comprises:
a container management system memory configured to store machine executable instructions; and
a container management system processor configured to execute the machine executable instructions, wherein execution of the machine executable instructions causes the container management system processor to,
receive multiple database requests via a first network connection, each of the multiple database requests including metadata descriptive of the corresponding,
calculate a receiving rate by counting the multiple database requests received during a desired duration,
calculate a processor count based on a predictive model and the receiving rate,
determine a number of data containers based on the receiving rate and a container memory model, each of the data containers being a block of the container management system memory assigned by continuous address space,
request a processor pool from a processor hosting service via a second network connection based on the processor count,
allocate data containers based on the number of the data containers in the container management system memory,
transfer the multiple database requests to the data containers as they are received, each of the multiple database requests is being assigned to a chosen data container selected from the data containers based on the metadata; and
transfer a filled data container selected from the number of data containers to the processor hosting service via the second network connection, the filled data container being filled with the multiple database requests abased on a desired threshold.

2. The database management system of claim 1, wherein the database management system further comprises:
the processor hosting service, the processor hosting service including multiple processor groups, each of the multiple processor groups including multiple processors and a shared memory; and
the processor hosting service is configured to allocate a portion of the multiple processor groups to the container management system to provide the processor pool.

3. The database management system of claim 2, wherein the container memory model is configured to format the multiple database requests into a page of memory for the shared memory for use by a request processor engine; and
the container management system processor is further caused to transfer the multiple database requests to the data containers as they are received by formatting the multiple database requests into the page of memory using the container memory model.

4. The database management system of claim 2, wherein each of the multiple processor groups is configured as one or more virtual computer systems.

5. The database management system of claim 2, wherein
the processor hosting service is configured to assigns a job token to each of the multiple processors in response to a page of memory being transferred into the shared memory;
the job token of each of the multiple processors assigns a portion of the shared memory to each of the multiple processors for processing the multiple database requests; and
in response to completion of the multiple database requests within the portion of the shared memory the processor hosting service is further configured to perform at least one,
modifying the job token to reassign a corresponding processor of the multiple processors to a new portion of the shared memory,
modifying the job token to reassign the corresponding processor to a different pool of processors, or
deleting the job token to release the corresponding processor.

6. The database management system of claim 2, wherein the multiple processors are configured to:
generate database transaction requests based on the multiple database requests; and
route the database transaction requests to two or more databases using a third network connection.

7. The database management system of claim 6, wherein the multiple processors are configured to receive a confirmation or a failure each of the database transaction requests via the third network connection.

8. The database management system of claim 7, wherein the multiple processors are configured to write the confirmation or the failure each of the database transaction requests periodically in a block chain log.

9. The database management system of claim 8, wherein the database management system further comprises:
an interface system configured to,
connect to multiple clients,
receive application requests from the multiple clients via a fourth network connection,
transform the application requests into the multiple database requests and the metadata,
repeatedly search the block chain log for a confirmation or a failure of each of the application requests, and
report the confirmation or the failure to the multiple clients upon finding the confirmation or the failure within the block chain log; and
the interface system includes a completion log for logging each of the application requests.

10. The database management system of claim 1, wherein the database management system is configured to at least partially sort the multiple database requests according to a set of desired rules.

11. The database management system of claim 10, wherein the database management system is configured to at least partially sort the multiple database requests according to a subset of the set of desired rules, wherein the subset is selected using the receiving rate.

12. The database management system of claim 1, wherein the database management system is configured to at least partially sorting the multiple database requests using an automatic binning algorithm to uniformly distribute the multiple database requests to the data containers.

13. The database management system of claim 12, wherein the automatic binning algorithm is at least one of:
a neural network, a cluster analysis algorithm, a principal components analysis algorithm, a decision tree sorting algorithm, a deep learning algorithm, a machine learning algorithm, or any combinations thereof.

14. The database management system of claim 1, wherein the database management system is a payment processing system.

15. The database management system of claim 1, wherein the container management system processor is configured to dynamically execute the machine executable instructions in run time memory.

16. A non-transitory computer-readable storage medium for storing machine executable instructions for execution by a container management processor controlling a container management system of a database management system, the container management processor is configured to execute the machine executable instructions, wherein execution of the machine executable instructions causes the container management processor to:
receive multiple database requests via a first network connection, each of the multiple database requests including metadata descriptive of the corresponding database requests;
calculate a receiving rate by counting the multiple database requests received during a desired duration;
calculate a processor count based on a predictive model and the receiving rate;
determine a number of data containers based on the receiving rate and a container memory model, each of the data containers being a block of memory of a container management system memory assigned by continuous address space;
request a processor pool from a processor hosting service via a second network connection based on the processor count;
allocate data containers based on the number of the data containers in the container management system memory;
transfer the multiple database requests to the data containers as they are received, each of the multiple database requests being assigned to a chosen data container selected from the data containers using the metadata; and
transfer a filled data container selected from the number of data containers to the processor hosting service via the second network connection, the filled data container being filled with the multiple database requests based on a desired threshold.

17. The non-transitory computer-readable storage medium of claim 16, wherein the container management processor is further caused to dynamically execute the machine executable instructions in run time memory.

18. The non-transitory computer-readable storage medium of claim 17, wherein
each of the multiple database requests are payment transactions; and
the database management system is a payment processing system.

19. A method of operating a database management system comprising a container management system, wherein the method comprises:
receiving multiple database requests via a first network connection, each of the multiple database requests including metadata descriptive of the corresponding database requests;
calculating a receiving rate by counting the multiple database requests received during a desired duration;
calculating a processor count based on predictive model and the receiving rate;
determining a number of data containers based on the receiving rate and a container memory model, each of the data containers being a block of memory of a container management system memory assigned by continuous address space;
requesting a processor pool from a processor hosting service via a second network connection based on the processor count;
allocating data containers based on the number of the data containers in the container management system memory;
transferring the multiple database requests to the data containers as they are received, each of the multiple database requests is being assigned to a chosen data container selected from the data containers based on the metadata; and
transferring a filled data container selected from the number of data containers to the processor hosting service via the second network connection, the filled data container being filled with the multiple database requests abased on a desired threshold.

20. The method of claim 19, wherein the database management system further comprises:
the processor hosting service, the processor hosting service including multiple processor groups, and each of the multiple processor groups including multiple processors and a shared memory;
the processor hosting service is configured to allocate a portion of the multiple processor groups to the container management system to provide the processor pool, and
assign a job token to each of the multiple processors in response to page of memory being transferred into the shared memory,
the job token of each of the multiple processors assigning a portion of the shared memory to each of the multiple processors for processing the multiple database requests; and
in response to completion of the multiple database requests within the portion of the shared memory the processor hosting service is further configured to perform at least one of,
modifying the job token to reassign a corresponding processor of the multiple processors to a new portion of the shared memory,
modifying the job token to reassign the corresponding processor to a different pool of processors, or
deleting the job token to release the corresponding processor.

* * * * *